US 012620814B2

(12) United States Patent
Hosoi et al.

(10) Patent No.: US 12,620,814 B2
(45) Date of Patent: May 5, 2026

(54) CHARGING SYSTEM INCLUDING AC/DC CONVERTER AND DC/DC CONVERTER IN WHICH INRUSH CURRENT IS SUPPRESSED

(71) Applicant: Panasonic Intellectual Property Management Co., Ltd., Osaka (JP)

(72) Inventors: Hiroyuki Hosoi, Osaka (JP); Atsushi Seki, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 657 days.

(21) Appl. No.: 18/164,393

(22) Filed: Feb. 3, 2023

(65) Prior Publication Data

US 2023/0268760 A1 Aug. 24, 2023

(30) Foreign Application Priority Data

Feb. 24, 2022 (JP) ................................. 2022-026820

(51) Int. Cl.
*H02J 7/00* (2026.01)
*H02J 7/06* (2006.01)
(Continued)

(52) U.S. Cl.
CPC ............. *H02J 7/06* (2013.01); *H02M 1/0058* (2021.05); *H02M 3/33573* (2021.05); *H02M 7/23* (2013.01); *H02J 2207/20* (2020.01)

(58) Field of Classification Search
CPC ........... H02J 7/06; H02J 7/23; H02M 3/33573
(Continued)

(56) References Cited

U.S. PATENT DOCUMENTS

2011/0164437 A1 7/2011 Sun et al.
2023/0111992 A1* 4/2023 Liu ......................... H02M 1/10
363/21.02

FOREIGN PATENT DOCUMENTS

JP 2012050264 A 3/2012
JP 2013516955 A 5/2013
(Continued)

OTHER PUBLICATIONS

Notice of Reasons for Refusal, dated Mar. 18, 2025, for Japanese Patent Application No. 2022-026820. (6 pages) (With English Machine Translation).

*Primary Examiner* — Nathaniel R Pelton
(74) *Attorney, Agent, or Firm* — Seed Intellectual Property Law Group LLP

(57) ABSTRACT

A charging system includes an AC/DC converter a DC/DC converter, and a control circuit. The AC/DC converter is connected between first/second input nodes and first/second intermediate nodes and is connected to an AC power supply via the first/second input nodes. The DC/DC converter is connected between the first/second intermediate nodes and first/second output nodes and is connectable to a battery via the first/second output nodes. The DC/DC converter includes an isolation transformer, a primary circuit, and a secondary circuit. The primary circuit includes switching elements. The control circuit causes the switching elements to start operation at a first frequency when the AC/DC converter and the DC/DC converter are activated, and causes the switching elements to operate at a second frequency when the AC/DC converter and the DC/DC converter are in steady operation. The first frequency is higher than the second frequency.

5 Claims, 6 Drawing Sheets

(51) Int. Cl.
    *H02M 1/00*          (2006.01)
    *H02M 3/335*         (2006.01)
    *H02M 7/23*          (2006.01)
(58) Field of Classification Search
    USPC ........................................................ 320/137
    See application file for complete search history.

(56)                    References Cited

FOREIGN PATENT DOCUMENTS

JP            2013247817  A      12/2013
JP               6024209  B2     11/2016
WO      WO 2011084379  A2      7/2011
WO            2017038363  A1      3/2017
WO      WO 2017038363       *   3/2017

* cited by examiner

FIG.2A

CONTROL SIGNAL

FIG.2B

PWM MODULATED WAVE

FIG.2C

PFM MODULATED WAVE

CHARGING SYSTEM INCLUDING AC/DC CONVERTER AND DC/DC CONVERTER IN WHICH INRUSH CURRENT IS SUPPRESSED

CROSS-REFERENCE TO RELATED APPLICATIONS

This application is based upon and claims the benefit of priority from Japanese Patent Application No. 2022-026820, filed on Feb. 24, 2022, the entire contents of which are incorporated herein by reference.

FIELD

The present disclosure relates generally to a charging system.

BACKGROUND

A charging system connected between an alternating current (AC) power supply and a battery is configured to convert AC power received from the AC power supply into direct current (DC) power, convert the DC power into other DC power, and charge the battery with the other DC power (See, for example, JP P2013-516955 A).

In such a charging system, an inrush current may be generated due to unstable DC power to be converted in a transition period at the time of activation when the supply of AC power by the AC power supply is started. In the charging system at this moment, it is desirable to suppress the inrush current.

SUMMARY

A charging system according to the present disclosure includes an AC/DC converter, a DC/DC converter, and a control circuit. The AC/DC converter is connected between: a first input node and a second input node, and a first intermediate node and a second intermediate node. The AC/DC converter is connected to an AC power supply via the first input node and the second input node. The DC/DC converter is connected between: the first intermediate node and the second intermediate node, and a first output node and a second output node. The DC/DC converter is connectable to a battery via the first output node and the second output node. The DC/DC converter includes an isolation transformer, a primary circuit, and a secondary circuit. The primary circuit is disposed on a primary side of the isolation transformer. The primary circuit includes switching elements. The secondary circuit is disposed on a secondary side of the isolation transformer. The control circuit is configured to cause the switching elements to start operation at a first frequency when the AC/DC converter and the DC/DC converter are activated. The control circuit is configured to cause the switching elements to operate at a second frequency when the AC/DC converter and the DC/DC converter are in steady operation. The first frequency is higher than the second frequency.

BRIEF DESCRIPTION OF THE DRAWINGS

FIGS. 2A to 2C are waveform diagrams illustrating pulse width modulation (PWM) control and pulse frequency modulation (PFM) control according to the embodiment;

DETAILED DESCRIPTION

Hereinafter, an embodiment of a charging system according to the present disclosure will be described with reference to the drawings.

Embodiment

Figure 1:
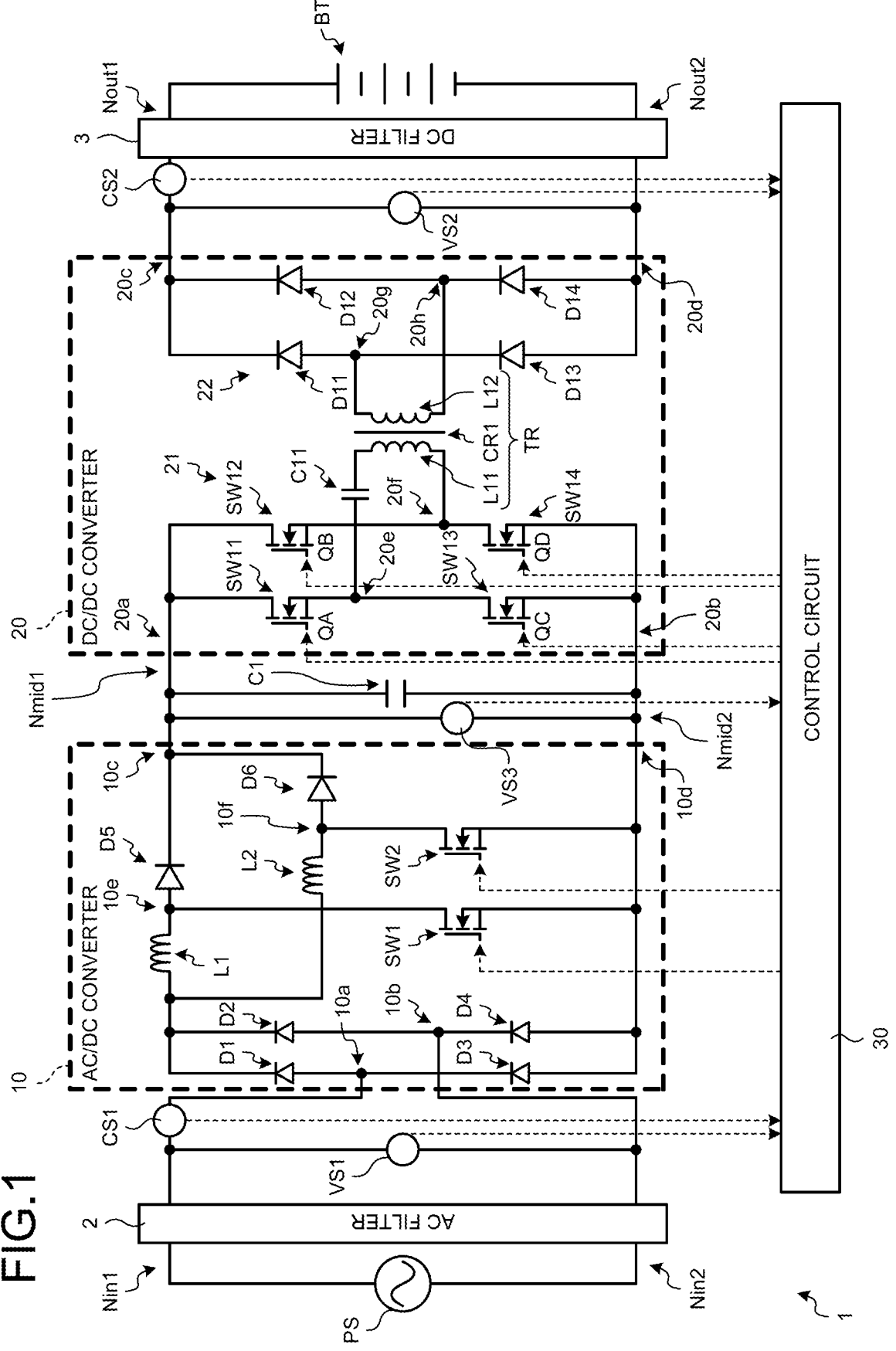
FIG. 1 is a circuit diagram illustrating a configuration of a charging system according to an embodiment.

The charging system according to the embodiment is connected between an AC power supply and a battery. The charging system is able to charge the battery by converting AC power of the AC power supply into DC power, whereas the charging system is devised to suppress an inrush current at the time of activation when the supply of the AC power by the AC power supply is started. For example, a charging system 1 can be configured as illustrated in FIG. 1. FIG. 1 is a circuit diagram illustrating a configuration of the charging system 1.

The charging system 1 is connected between an AC power supply PS and a battery BT. The charging system 1 includes an AC/DC converter 10, a DC/DC converter 20, and a control circuit 30. The DC/DC converter 20 is, for example, an LLC converter. Under the control of the control circuit 30, the charging system 1 converts an AC voltage Vin from the AC power supply PS into a DC voltage Vsub while stepping up the AC voltage Vin by the AC/DC converter 10, converts the converted DC voltage Vsub into a DC voltage Vout for charging while stepping down the DC voltage Vsub by the DC/DC converter 20, and charges the battery BT. The charging system 1 may be, for example, an in-vehicle charger mounted on an electric vehicle or a hybrid vehicle, or the AC power supply PS may be a power system at home or a charging stand, or the battery BT may be an in-vehicle battery.

In the charging system 1, an input node Nin1 is connected to one end of the AC power supply PS, and an input node Nin2 is connected to another end of the AC power supply PS. In the charging system 1, an output node Nout1 is connected to the positive electrode of the battery BT, and an output node Nout2 is connected to the negative electrode of the battery BT.

In the charging system 1, the control circuit 30 performs pulse width modulation (PWM) control on switching elements in the AC/DC converter 10 and switching elements in the DC/DC converter 20 at the time of activation of the AC/DC converter 10 and the DC/DC converter 20. The control circuit 30 of the charging system 1 performs the PWM control on the switching elements in the AC/DC converter 10 and performs pulse frequency modulation (PFM) control on the switching elements in the DC/DC converter 20 during steady operation of the AC/DC converter 10 and the DC/DC converter 20.

Figures 2A, 2B, 2C:
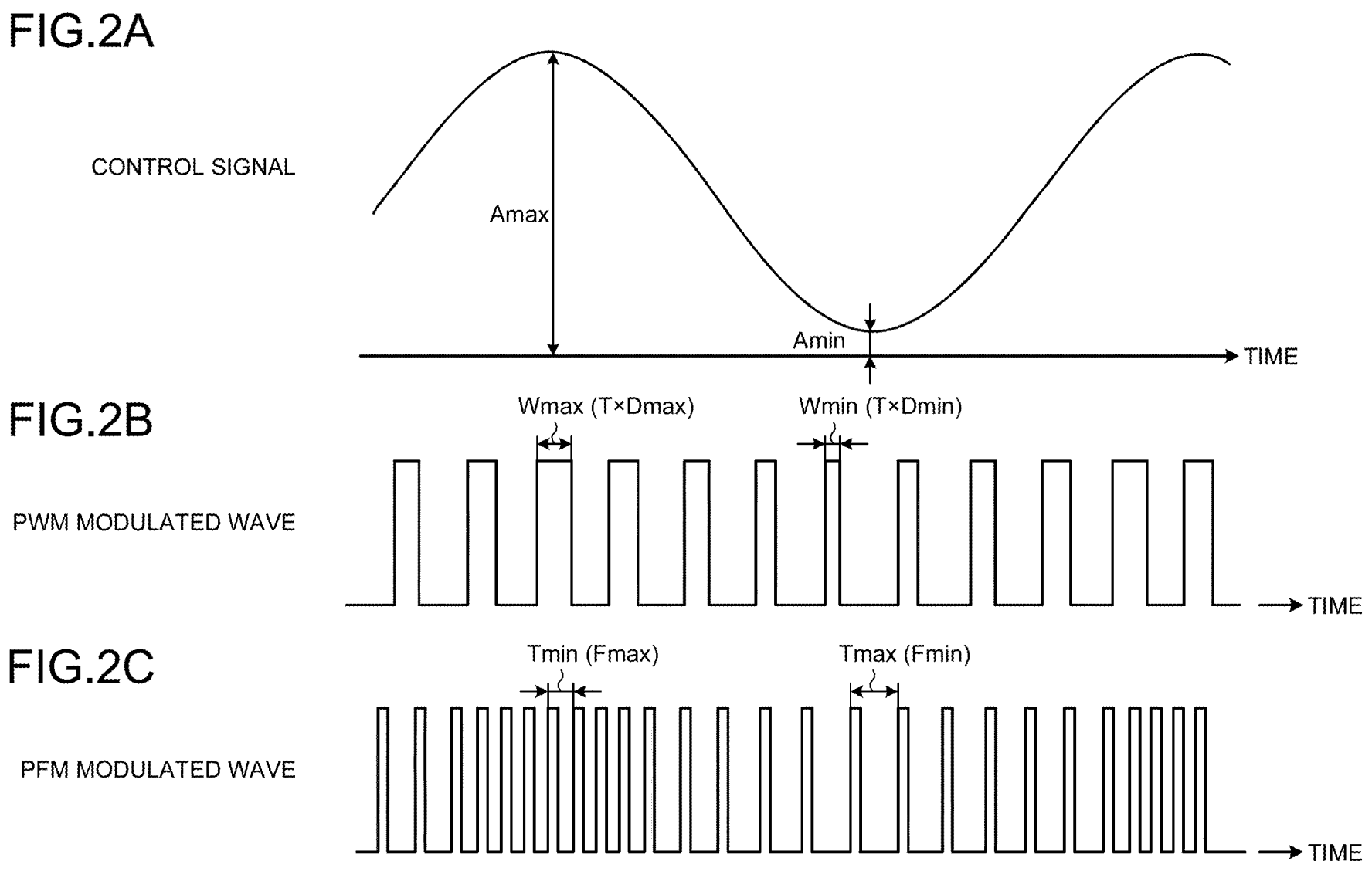

As illustrated in FIGS. 2A and 2B, the PWM control is control to modulate the pulse width of a pulse signal in accordance with the level of a control signal. FIG. 2A to 2C are waveform diagrams illustrating the PWM control and the PFM control. The control circuit 30 changes a pulse width from a reference pulse width in accordance with the amount of change in the level of the control signal from the reference level. Although the cycle is arbitrary in this case, the cycle may be maintained constant.

In a case of performing the PWM control, the control circuit 30 generates a PWM modulated wave illustrated in FIG. 2B in accordance with a control signal illustrated in FIG. 2A. For example, the reference level of the control signal is set to a maximum amplitude Amax, and the reference pulse width of the PWM control is set to a maximum pulse width Wmax. In response to the maximum amplitude Amax of the control signal, the control circuit 30 sets the pulse width of the PWM modulated wave to the maximum pulse width (the reference pulse width) Wmax in accordance with the maximum amplitude Amax of the control signal. In response to a minimum amplitude Amin of the control signal, the control circuit 30 decreases the pulse width of the PWM control from the maximum pulse width (the reference pulse width) Wmax to a minimum pulse width Wmin in accordance with the amount of change of the minimum amplitude Amin of the control signal from the maximum amplitude Amax.

In the above case, if the cycle is kept to be a constant T, the control circuit 30 changes a duty ratio from a reference duty ratio in accordance with the amount of change in the level of the control signal from the reference level. For example, the reference level of the control signal is set to the maximum amplitude Amax, and the reference duty ratio of the PWM modulated wave is set to a maximum duty ratio Dmax. In response to the maximum amplitude Amax of the control signal, the control circuit 30 sets the duty ratio of the PWM modulated wave to the maximum duty ratio (the reference duty ratio) Dmax in accordance with the maximum amplitude Amax of the control signal. The control circuit sets the pulse width of the PWM modulated wave to the maximum pulse width Wmax (=T×Dmax). In response to the minimum amplitude Amin of the control signal, the control circuit 30 decreases the duty ratio of the PWM modulated wave in accordance with the amount of change of the minimum amplitude Amin of the control signal from the maximum amplitude Amax to set the duty ratio to a minimum duty ratio Dmin. The control circuit 30 sets the pulse width of the PWM control to the minimum pulse width Wmin (=T×Dmin).

As illustrated in FIGS. 2A and 2C, the PFM control is control to modulate the frequency of a pulse signal in accordance with the level of a control signal. The control circuit 30 changes the frequency from a reference frequency in accordance with the amount of change in the level of the control signal from the reference level. The pulse width is optionally set in this case, whereas the pulse width may be maintained constant. The duty ratio may be maintained constant. FIG. 2C illustrates a case where the pulse width is maintained constant.

In a case of performing the PFM control, the control circuit 30 generates a PFM modulated wave illustrated in FIG. 2C in accordance with the control signal illustrated in FIG. 2A. For example, the reference level of the control signal is set to the maximum amplitude Amax, and the reference frequency of the PFM control is set to a maximum frequency Fmax. Alternatively, the reference cycle of the PFM control is set to a minimum cycle Tmin. In response to the maximum amplitude Amax of the control signal, the control circuit 30 sets the frequency of the PFM modulated wave to the maximum frequency (the reference frequency) Fmax in accordance with the maximum amplitude Amax of the control signal. In response to the minimum amplitude Amin of the control signal, the control circuit 30 lowers the frequency of the PFM control from the maximum frequency (the reference frequency) Fmax to a minimum frequency Fmin in accordance with the amount of change of the minimum amplitude Amin of the control signal from the maximum amplitude Amax. Alternatively, the control circuit 30 increases the cycle of the PFM control from the minimum cycle (the reference cycle) Tmin to a maximum cycle Tmax in accordance with the amount of change of the minimum amplitude Amin of the control signal from the maximum amplitude Amax.

Returning to FIG. 1, the charging system 1 includes an AC filter 2, a capacitive element C1, a DC filter 3, voltage sensors VS1 to VS3, and current sensors CS1 and CS2 in addition to the AC/DC converter 10, the DC/DC converter 20, and the control circuit 30.

The AC filter 2 is connected between the input nodes Nin1 and Nin2 and the AC/DC converter 10. In the AC filter 2, one end is connected between the input node Nin1 and an input node 10*a* of the AC/DC converter 10, and another end is connected between the input node Nin2 and an input node 10*b* of the AC/DC converter 10. When a noise component flows out from the AC/DC converter 10 side, the AC filter 2 performs filter processing on the noise component to attenuate the noise component. As a result, the AC filter 2 can prevent the noise component from flowing out from the AC/DC converter side to the AC power supply PS.

The AC/DC converter 10 is connected between the input nodes Nin1 and Nin2 and intermediate nodes Nmid1 and Nmid2. The AC/DC converter 10 can be connected to the AC power supply PS via the input nodes Nin1 and Nin2. The AC/DC converter 10 is connected between the AC filter 2 and the intermediate nodes Nmid1 and Nmid2. The AC/DC converter 10 uses a power factor correction (PFC) circuit to convert AC power into DC power while improving the power factor of the AC power.

The AC/DC converter 10 includes, for example, as a PFC circuit, a plurality of rectifier elements D1 to D6, a plurality of inductive elements L1 and L2, and a plurality of switching elements SW1 and SW2. The rectifier elements D1 to D4 are bridge-connected to form a bridge circuit. In this configuration, after an AC voltage is full-wave rectified by the bridge circuit, energy is repeatedly accumulated and released in the inductive elements L1 and L2 by switching operation of the switching elements SW1 and SW2, and stop and injection of a current to the capacitive element C1 via the rectifier elements D5 and D6 are repeated accordingly. As a result, the AC/DC converter 10 can generate the DC voltage Vsub while bringing the phase of the AC current close to the phase of the AC voltage, and can improve power factor.

The rectifier element D1 performs rectification in a direction from the input node 10*a* toward an output node 10*c*. In one example, the rectifier element D1 is a diode. The rectifier element D1 has an anode connected to the input node 10*a* and a cathode connected to the output node 10*c* via the inductive element L1 and the rectifier element D5.

The rectifier element D2 performs rectification in a direction from the input node 10*b* toward the output node 10*c*. In one example, the rectifier element D2 is a diode. The rectifier element D2 has an anode connected to the input node 10*b* and a cathode connected to the output node 10*c* via the inductive element L1 and the rectifier element D5.

The rectifier element D3 performs rectification in a direction from the input node 10*a* toward an output node 10*d*. In one example, the rectifier element D3 is a diode. The rectifier element D3 has an anode connected to the input node 10a and a cathode connected to the output node 10d.

The rectifier element D4 performs rectification in a direction from the input node 10b toward the output node 10d. In one example, the rectifier element D4 is a diode. The rectifier element D4 has an anode connected to the input node 10b and a cathode connected to the output node 10d.

Between the rectifier elements D1 and D2 and the output node 10c, series connection of the inductive element L1 and the rectifier element D5 and series connection of the inductive element L2 and the rectifier element D6 are connected in parallel. The switching element SW1 is connected between the output node 10d and a node 10e that is provided between the inductive element L1 and the rectifier element D5. The switching element SW2 is connected between the output node 10d and a node 10f that is provided between the inductive element L2 and the rectifier element D6.

The inductive element L1 is connected between the rectifier elements D1 and D2 and the node 10e. In one example, the inductive element L1 is a coil. In the inductive element L1, one end is connected to the rectifier elements D1 and D2, and another end is connected to the node 10e. The inductive element L1 can contribute to improvement of the power factor of the AC/DC converter 10 by accumulating and releasing electromagnetic energy.

The rectifier element D5 performs rectification in a direction from the node 10e toward the output node 10c. In one example, the rectifier element D5 is a diode. The rectifier element D5 has an anode connected to the node 10e and a cathode connected to the output node 10c.

The inductive element L2 is connected between the rectifier elements D1 and D2 and the node 10f. In one example, the inductive element L2 is a coil. In the inductive element L2, one end is connected to the rectifier elements D1 and D2, and another end is connected to the node 10f. The inductive element L2 can contribute to improvement of the power factor of the AC/DC converter 10 by accumulating and releasing electromagnetic energy.

The rectifier element D6 performs rectification in a direction from the node 10f toward the output node 10c. In one example, the rectifier element D6 is a diode. The rectifier element D6 has an anode connected to the node 10f and a cathode connected to the output node 10c.

The switching element SW1 is connected between the node 10e and the rectifier elements D3 and D4. The switching element SW1 electrically connects and disconnects the node 10e and the rectifier elements D3 and D4 in accordance with the control signal from the control circuit 30. In one example, the switching element SW1 is an N-channel metal oxide semiconductor field effect (MOSFET) transistor. In the switching element SW1 of this example, a source is connected to the rectifier elements D3 and D4, a drain is connected to the node 10e, and a gate is connected to the control circuit 30.

Upon receiving an active level control signal from the control circuit 30 at the gate, the switching element SW1 is turned on and electrically connects the node 10e and the rectifier elements D3 and D4. Upon receiving a non-active level control signal from the control circuit 30 at the gate, the switching element SW1 is turned off and electrically disconnects the node 10e and the rectifier elements D3 and D4.

The switching element SW2 is connected between the node 10f and the rectifier elements D3 and D4. The switching element SW2 electrically connects and disconnects the node 10f and the rectifier elements D3 and D4 in accordance with the control signal from the control circuit 30. In one example, the switching element SW2 is an N-channel MOS- FET transistor. In the switching element SW2 of this example, a source is connected to the rectifier elements D3 and D4, a drain is connected to the node 10f, and a gate is connected to the control circuit 30.

Upon receiving an active level control signal from the control circuit 30 at the gate, the switching element SW2 is turned on and electrically connects the node 10f and the rectifier elements D3 and D4. Upon receiving a non-active level control signal from the control circuit 30 at the gate, the switching element SW2 is turned off and electrically disconnects the node 10f and the rectifier elements D3 and D4.

The capacitive element C1 is connected between the AC/DC converter 10 and the DC/DC converter 20. In one example, the capacitive element C1 is a smoothing capacitor such as an aluminum electrolytic capacitor, a film capacitor, or a ceramic capacitor. In the capacitive element C1, one end is connected to the intermediate node Nmid1, and another end is connected to the intermediate node Nmid2. The capacitive element C1 can contribute to improvement of the power factor of the AC/DC converter 10 by discharging and charging charges, and can generate the DC voltage Vsub.

The DC/DC converter 20 is, for example, an LLC converter. The DC/DC converter is connected between the intermediate nodes Nmid1 and Nmid2 and the output nodes Nout1 and Nout2. In the DC/DC converter 20, input nodes 20a and 20b are connected to the intermediate nodes Nmid1 and Nmid2, and output nodes 20c and 20d are connected to the output nodes Nout1 and Nout2. The DC/DC converter 20 can be connected to the battery BT via the output nodes Nout1 and Nout2. The DC/DC converter 20 is connected between the intermediate nodes Nmid1 and Nmid2 and the DC filter 3. The DC/DC converter 20 uses an isolation transformer TR in order to convert DC power into DC power for charging while isolating and separating an input side (primary side) and an output side (secondary side).

The DC/DC converter 20 includes, for example, a primary circuit 21, the isolation transformer TR, and a secondary circuit 22. The primary circuit 21 includes a plurality of switching elements SW11 to SW14 and a capacitive element C11. The isolation transformer TR includes a primary winding L11, a secondary winding L12, and a core CR1. The secondary circuit 22 includes a plurality of rectifier elements D11 to D14.

The switching element SW11 is connected between the input node 20a and a node 20e. The switching element SW11 electrically connects and disconnects the input node 20a and the node 20e in accordance with the control signal from the control circuit 30. In one example, the switching element SW11 is an N-channel MOSFET transistor. In the switching element SW11 of this example, a source is connected to the node 20e, a drain is connected to the input node 20a, and a gate is connected to the control circuit 30.

Upon receiving an active level control signal from the control circuit 30 at the gate, the switching element SW11 is turned on and electrically connects the input node 20a and the node 20e. Upon receiving a non-active level control signal from the control circuit 30 at the gate, the switching element SW11 is turned off and electrically disconnects the input node 20a and the node 20e.

The switching element SW12 is connected between the input node 20a and a node 20f The switching element SW12 electrically connects and disconnects the input node 20a and the node 20f in accordance with the control signal from the control circuit 30. The switching element SW12 is, for example, an N-channel MOSFET transistor. In the switching element SW12 of this example, a source is connected to the node 20f, a drain is connected to the input node 20a, and a gate is connected to the control circuit 30.

Upon receiving an active level control signal from the control circuit 30 at the gate, the switching element SW12 is turned on and electrically connects the input node 20a and the node 20f. Upon receiving a non-active level control signal from the control circuit 30 at the gate, the switching element SW12 is turned off and electrically disconnects the input node 20a and the node 20f.

The switching element SW13 is connected between the node 20e and the input node 20b. The switching element SW13 electrically connects and disconnects the node 20e and the input node 20b in accordance with the control signal from the control circuit 30. The switching element SW13 is, for example, an N-channel MOSFET transistor. In the switching element SW13 of this case, a source is connected to the input node 20b, a drain is connected to the node 20e, and a gate is connected to the control circuit 30.

Upon receiving an active level control signal from the control circuit 30 at the gate, the switching element SW13 is turned on and electrically connects the node 20e and the input node 20b. Upon receiving a non-active level control signal from the control circuit at the gate, the switching element SW13 is turned off and electrically disconnects the node 20e and the input node 20b.

The switching element SW14 is connected between the node 20f and the input node 20b. The switching element SW14 electrically connects and disconnects the node 20f and the input node 20b in accordance with the control signal from the control circuit 30. The switching element SW14 is, for example, an N-channel MOSFET transistor. In the switching element SW14 of this example, a source is connected to the input node 20b, a drain is connected to the node 20f, and a gate is connected to the control circuit 30.

Upon receiving an active level control signal from the control circuit 30 at the gate, the switching element SW14 is turned on and electrically connects the node 20f and the input node 20b. Upon receiving a non-active level control signal from the control circuit at the gate, the switching element SW14 is turned off and electrically disconnects the node 20f and the input node 20b.

Note that the electrodes of the transistor are described as a drain, a gate, and a source on the premise that each of the switching elements SW1, SW2, and SW11 to SW14 is an N-channel MOSFET. However, in a case where the switching elements SW1, SW2, and SW11 to SW14 are each an insulated gate bipolar transistor (IGBT), the drain can be read as a collector, and the source can be read as an emitter.

The capacitive element C11 is connected between the node 20e and the primary winding L11. In the capacitive element C11, one end connected to the node 20e, and another end is connected to one end of the primary winding L11. The capacitive element C11 can reduce a switching loss due to the switching elements SW11 to SW14 by performing resonance operation together with the primary winding L11.

In the isolation transformer TR, the primary winding L11 is electrically isolated from the secondary winding L12 and magnetically coupled to the secondary winding L12 via the core CR1. In one example, the primary winding L11 and the secondary winding L12 are each a coil. The isolation transformer TR may be of a flyback type. As indicated by bullet points in FIG. 1, the primary winding L11 and the secondary winding L12 are wound in opposite directions to each other with respect to a path through which lines of magnetic force in the core CR1 pass. In the isolation transformer TR, the primary winding L11 may have a configuration in which the core CR1 is omitted as long as the primary winding L11 and the secondary winding L12 are magnetically coupled to each other.

In the primary winding L11, one end is connected to the node 20e via the capacitive element C11, and another end is connected to the node 20f. In the secondary winding L12, one end is connected to a node 20g, and another end is connected to a node 20h.

The rectifier element D11 performs rectification in a direction from the node 20g toward the output node 20c. The rectifier element D11 is, for example, a diode, and has an anode connected to the node 20g and a cathode connected to the output node 20c.

The rectifier element D12 performs rectification in a direction from the node 20f toward the output node 20c. In one example, the rectifier element D12 is a diode. In the rectifier element D12 of this example, an anode is connected to the node 20f, and a cathode is connected to the output node 20c.

The rectifier element D13 performs rectification in a direction from the output node 20d toward the node 20g. The rectifier element D13 is, for example, a diode, and has an anode connected to the output node 20d and a cathode connected to the node 20g.

The rectifier element D14 performs rectification in a direction from the output node 20d toward the node 20h. In one example, the rectifier element D14 is a diode. In the rectifier element D14 of this example, an anode is connected to the output node 20d, and a cathode is connected to the node 20h.

The DC filter 3 is connected between the DC/DC converter 20 and the output nodes Nout1 and Nout2. In the DC filter 3, one end is connected between the DC/DC converter and the output node Nout1, and another end is connected between the DC/DC converter and the output node Nout2. The DC filter 3 performs filter processing on DC power supplied from the DC filter 3 and supplies the processed DC power to the battery BT. As a result, the DC filter 3 can reduce a noise included in the DC power and supply the DC power to the battery BT.

The voltage sensor VS1 detects the input voltage Vin of the charging system 1. The voltage sensor VS1 detects, as the input voltage Vin, a voltage between the input node 10a and the input node 10b. The voltage sensor VS1 supplies the detected input voltage Vin to the control circuit 30.

The voltage sensor VS2 detects the output voltage Vout of the charging system 1. The voltage sensor VS2 detects, as the output voltage Vout, a voltage between the output node 20c and the output node 20d. The voltage sensor VS2 supplies the detected output voltage Vout to the control circuit 30.

The voltage sensor VS3 detects the voltage Vsub of the charging system 1. The voltage sensor VS3 detects, as the voltage Vsub, a voltage between the intermediate node Nmid1 and the intermediate node Nmid2. The voltage sensor VS3 supplies the detected voltage Vsub to the control circuit 30.

A current sensor CS1 detects an input current Iin of the charging system 1. The current sensor CS1 detects, as the input current Iin, a current flowing between the input node Nin1 and the input node 10a. The current sensor CS1 supplies the detected input current Iin to the control circuit 30.

A current sensor CS2 detects an output current Tout of the charging system 1. The current sensor CS2 detects, as the output current Tout, a current flowing between the output node 20c and the output node Nout1. The current sensor CS2 supplies the detected output current Tout to the control circuit 30.

The control circuit 30 performs the PWM control on the switching elements in the AC/DC converter 10 and the switching elements in the DC/DC converter 20 when the AC/DC converter 10 and the DC/DC converter 20 are activated. The control circuit 30 controls the operation frequency of the switching element in the DC/DC converter 20 to a frequency Fstart higher than a frequency Fop during steady operation. The frequency Fstart is closer to a resonance frequency of the isolation transformer TR than the frequency Fop is. Therefore, the control circuit 30 can control the output voltage of the isolation transformer TR to be lower than that on the output side of the DC/DC converter 20 by controlling the operation frequency of the switching element to the frequency Fstart.

At the time of activation, the control circuit 30 starts operation of the switching element at the frequency Fstart. The control circuit 30 increases the reference duty ratio of the PWM control from an initial value (for example, zero) to a predetermined duty ratio while maintaining the operation frequency of the switching element in the DC/DC converter 20 at the frequency Fstart. Thereafter, the control circuit 30 lowers the operation frequency of the switching element from the frequency Fstart to the frequency Fop while maintaining the reference duty ratio of the PWM control at the predetermined duty ratio. The control circuit 30 lowers the operation frequency of the switching element from the frequency Fstart to the frequency Fop in a gradual manner or in a step-by-step manner. As a result, the control circuit 30 can cause a gradual or step-by-step transition from a state where the output voltage of the isolation transformer TR is lower than that on the output side of the DC/DC converter 20 to a state where the output voltage of the isolation transformer TR is higher than that on the output side of the DC/DC converter 20. As a result, a gate signal of the switching element can be appropriately adjusted, and an inrush current at the time of activation of the charging system 1 can be suppressed.

During steady operation of the AC/DC converter 10 and the DC/DC converter 20, the control circuit 30 performs the PWM control on the switching element in the AC/DC converter 10 and performs the PFM control on the switching element in the DC/DC converter 20. The control circuit 30 controls the switching element in the DC/DC converter 20 by varying the frequency in accordance with the level of the control signal while setting a predetermined frequency as a reference frequency of the PFM control.

Figure 3:
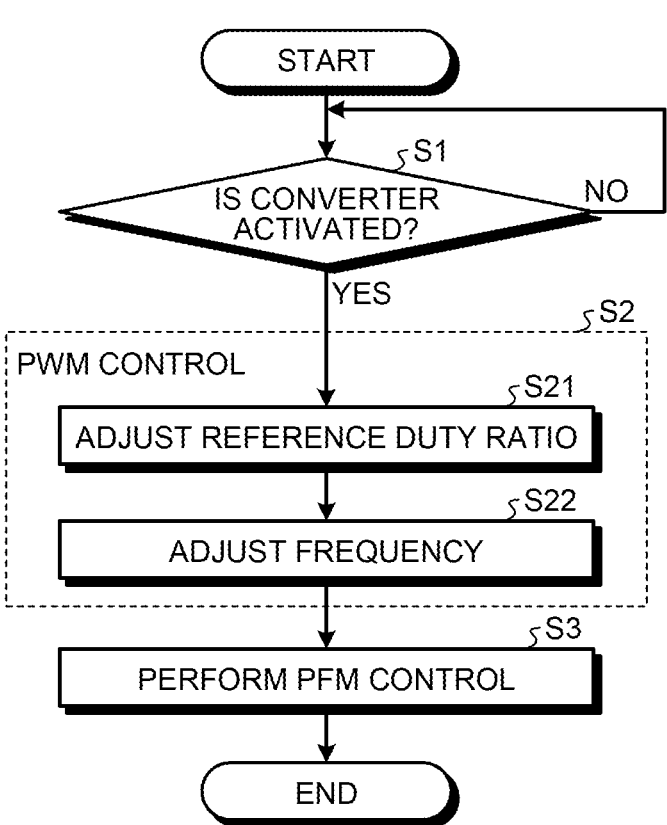
FIG. 3 is a flowchart illustrating operation of the charging system according to the embodiment.

For example, the control circuit 30 performs control as illustrated in FIG. 3 at the time of activation. FIG. 3 is a flowchart illustrating operation of the charging system 1.

In the charging system 1, the control circuit 30 waits until receiving an activation command (No in S1). Upon receiving the activation command (Yes in S1), the control circuit 30 activates the AC/DC converter 10 and starts the PWM control (S2) on the DC/DC converter 20 at the operation frequency Fstart. The control circuit 30 activates the DC/DC converter 20 at the frequency Fstart at which the output voltage of the isolation transformer TR in the DC/DC converter 20 becomes lower than the voltage of the battery BT by using previously acquired voltage gain-load-frequency correspondence information (see FIG. 4). That is, switching operation of the switching elements SW11 to SW14 is started at the operation frequency Fstart.

Figure 4:
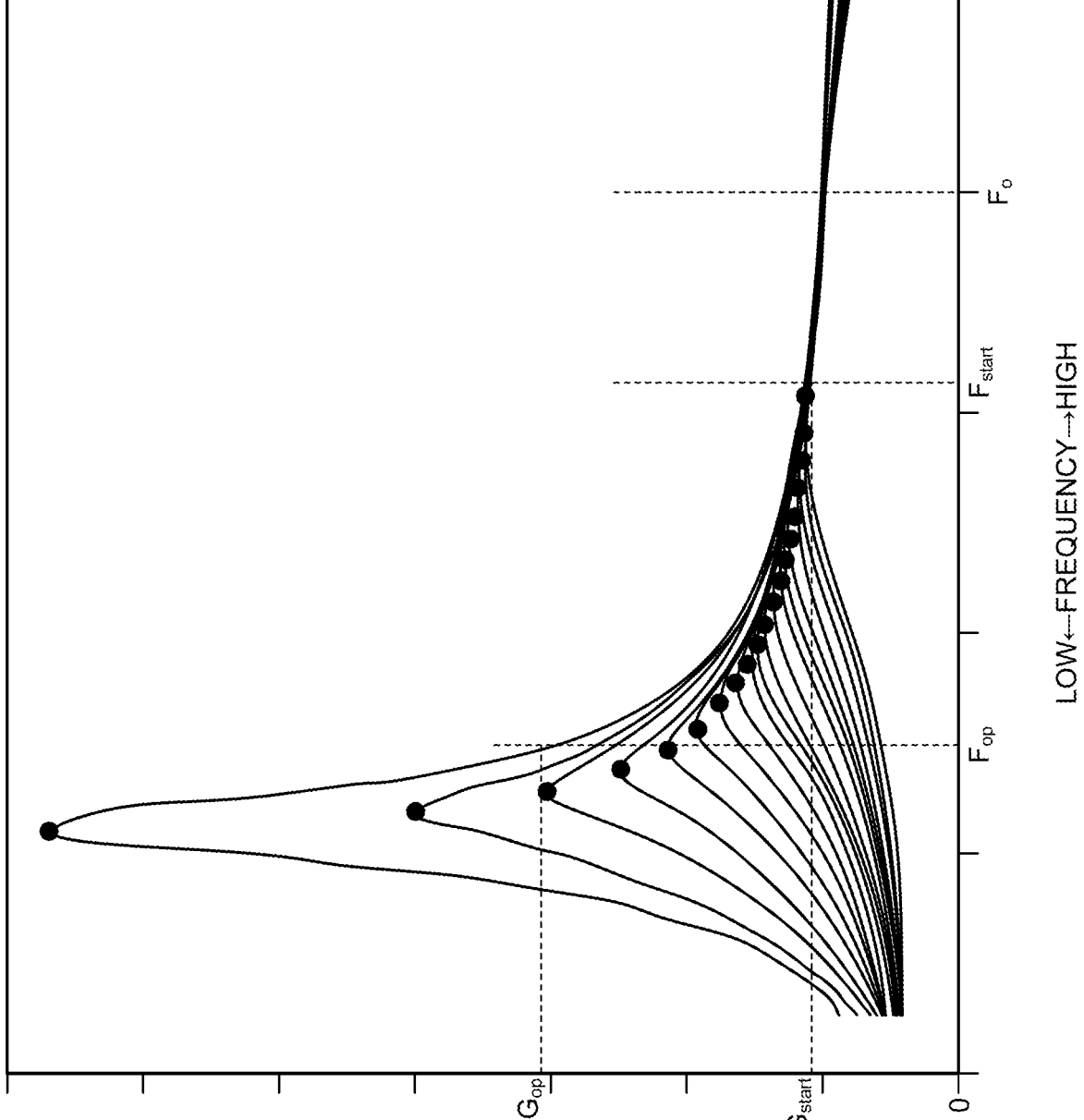
FIG. 4 is a diagram illustrating a relationship between operation frequencies of switching elements and voltage gains of the charging system in the embodiment.

As illustrated in FIG. 4, the operation frequency Fstart is higher than the operation frequency Fop for the steady operation. FIG. 4 is a diagram illustrating a relationship between operation frequencies of the switching elements SW11 to SW14 and voltage gains of the charging system 1. In FIG. 4, the relationship between the operation frequencies of the switching elements SW11 to SW14 and the voltage gains of the charging system 1 is illustrated with respect to different load states of the battery BT. As illustrated in FIG. 4, the operation frequency Fstart is closer to a resonance frequency $F_0$ of the isolation transformer TR than the operation frequency Fop is. Thus, a voltage gain Gstart of the charging system 1 corresponding to the operation frequency Fstart is lower than a voltage gain Gop of the charging system 1 corresponding to the operation frequency Fop in any of the load states of the battery BT. Accordingly, the control circuit 30 can perform control such that the output voltage of the isolation transformer TR becomes lower than that on the output side of the DC/DC converter 20 regardless of the load state of the battery BT by controlling the operation frequency of the switching element to the frequency Fstart.

Returning to FIG. 3, when the PWM control is started, the control circuit 30 adjusts the reference duty ratio of the PWM control (S21). The control circuit 30 increases the reference duty ratio of the PWM control from the initial value to a predetermined duty ratio while maintaining the operation frequencies of the switching elements S11 to S14 at the frequency Fstart (while maintaining the operation cycles of the switching elements S11 to S14 at a cycle Tstart). The predetermined duty ratio is, for example, approximately 0.5, and can be set to 0.45 to 0.49 in a case where a dead time is provided. The cycle Tstart is a cycle corresponding to the frequency Fstart.

Figure 5:
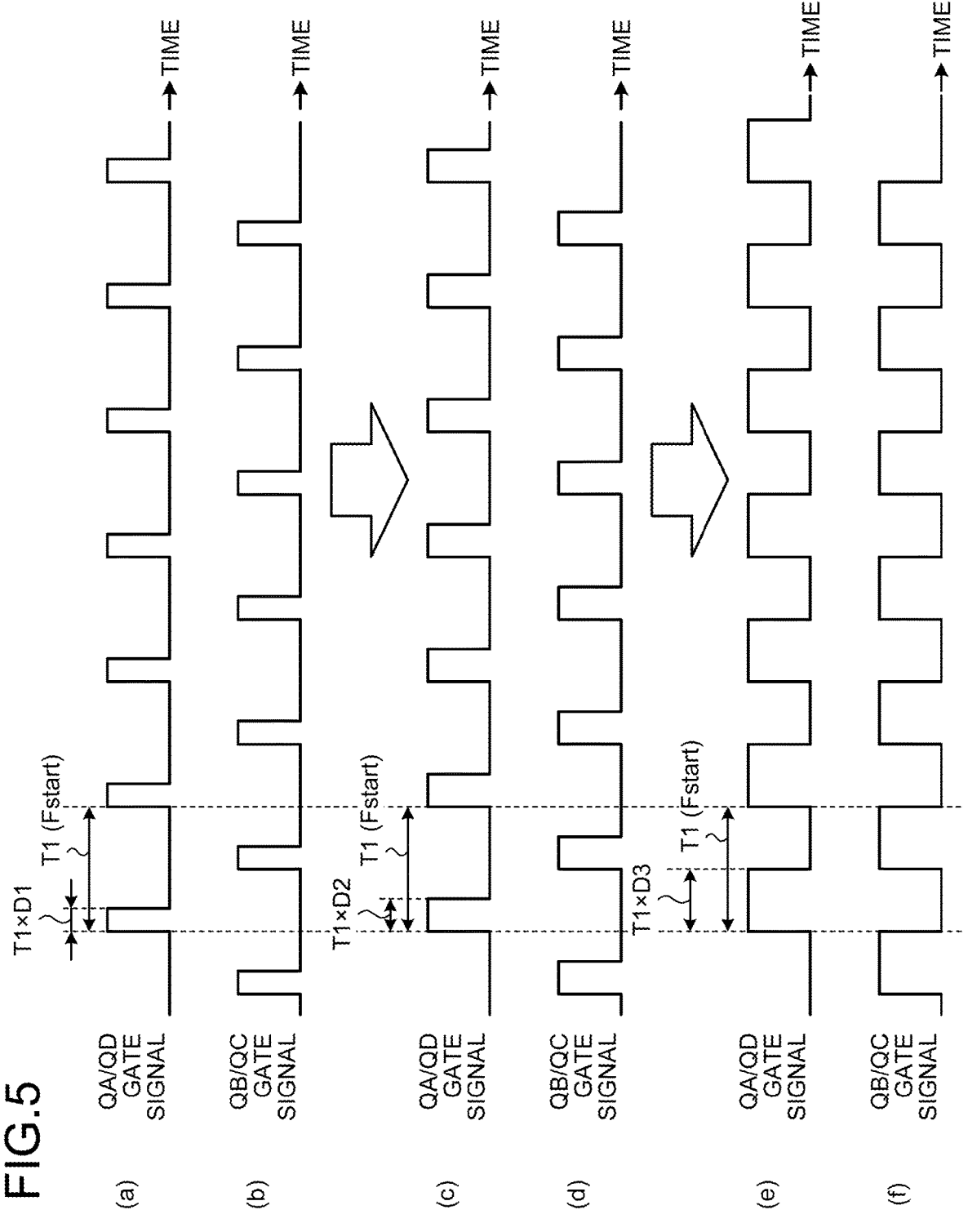
FIG. 5 is a waveform diagram illustrating operation of the charging system according to the embodiment.

For example, as illustrated by a waveform (a) in FIG. 5, the control circuit 30 generates gate signals QA and QD of the switching elements SW11 and SW14 at a cycle T1 corresponding to the frequency Fstart. At this moment, the control circuit 30 increases the reference duty ratio of the PWM control from the initial value (=0) to D1. The control circuit 30 generates the gate signals QA and QD of the switching elements SW11 and SW14 by performing PWM modulation with a reference pulse width T1×D1 corresponding to the reference duty ratio D1. Similarly, as illustrated by a waveform (b) in FIG. 5, the control circuit 30 generates gate signals QB and QC of the switching elements SW12 and SW13 by performing the PWM modulation with the cycle T1 and the reference pulse width T1×D1. Note that the gate signals QA and QD and the gate signals QB and QC are complementarily maintained at an H level.

As illustrated by a waveform (c) in FIG. 5, the control circuit 30 increases the reference duty ratio of the PWM control from D1 to D2 (>D1) while maintaining the frequencies of the gate signals QA and QD of the switching elements SW11 and SW14 at Fstart (while maintaining the cycle at T1). The control circuit 30 generates the gate signals QA and QD of the switching elements SW11 and SW14 by performing the PWM modulation with a reference pulse width T1×D2 corresponding to the reference duty ratio D2. Similarly, as illustrated by a waveform (d) in FIG. 5, the control circuit 30 generates the gate signals QB and QC of the switching elements SW12 and SW13 by performing the PWM modulation with the cycle T1 and the reference pulse width T1×D2.

As illustrated by a waveform (e) in FIG. 5, the control circuit 30 increases the reference duty ratio of the PWM control from D2 to D3 (>D2) while maintaining the frequencies of the gate signals QA and QD of the switching elements SW11 and SW14 at Fstart (while maintaining the cycle at T1). The control circuit 30 generates the gate signals QA and QD of the switching elements SW11 and SW14 by performing the PWM modulation with a reference pulse width T1×D3 corresponding to the reference duty ratio D3. Similarly, as illustrated by a waveform (f) in FIG. 5, the control circuit 30 generates the gate signals QB and QC of the switching elements SW12 and SW13 by performing the PWM modulation with the cycle T1 and the reference pulse width T1×D3.

Returning to FIG. 3, when the adjustment of the reference duty ratio (S21) is completed, the control circuit 30 adjusts the frequency (S22). The control circuit 30 lowers the operation frequencies of the switching elements SW11 to SW14 from the frequency Fstart to the frequency Fop while maintaining the reference duty ratio of the gate signals of the switching elements SW11 to SW14 at a predetermined duty ratio.

Figure 6:
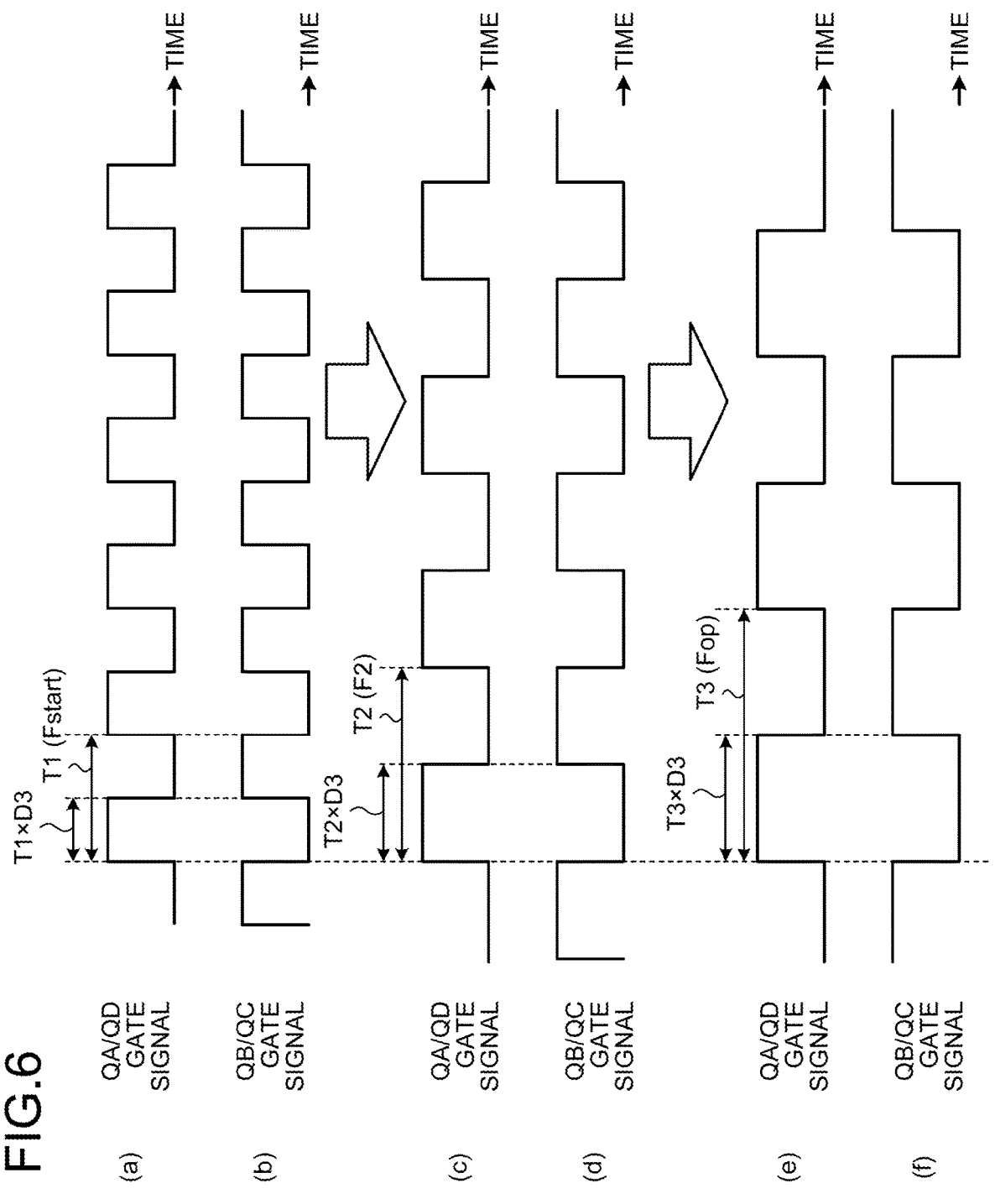
FIG. 6 is a waveform diagram illustrating operation of the charging system according to the embodiment.

For example, as illustrated by a waveform (a) in FIG. 6, the control circuit 30 generates the gate signals QA and QD of the switching elements SW11 and SW14 by performing the PWM modulation with the cycle T1 corresponding to the frequency Fstart and the reference pulse width T1×D3 corresponding to the reference duty ratio D3. Similarly, as illustrated by a waveform (b) in FIG. 6, the control circuit 30 generates the gate signals QB and QC of the switching elements SW12 and SW13 by performing the PWM modulation with the cycle T1 and the reference pulse width T1×D3.

As illustrated by a waveform (c) in FIG. 6, the control circuit 30 lowers the frequency from Fstart to F2 (<Fstart) while maintaining the reference duty ratio of the PWM control of the gate signals QA and QD of the switching elements SW11 and SW14 at D3. The control circuit 30 generates the gate signals QA and QD of the switching elements SW11 and SW14 by performing the PWM modulation with a cycle T2 (>T1) corresponding to the frequency F2 and a reference pulse width T2×D3 corresponding to the reference duty ratio D3. Similarly, as illustrated by a waveform (d) in FIG. 6, the control circuit 30 generates the gate signals QB and QC of the switching elements SW12 and SW13 by performing the PWM modulation with the cycle T2 and the reference pulse width T2×D3.

As illustrated by a waveform (e) in FIG. 6, the control circuit 30 lowers the frequency from F2 to Fop (<F2) while maintaining the reference duty ratio of the PWM control of the gate signals QA and QD of the switching elements SW11 and SW14 at D3. The control circuit 30 generates the gate signals QA and QD of the switching elements SW11 and SW14 by performing the PWM modulation with a cycle T3 (>T2) corresponding to the frequency Fop and a reference pulse width T3×D3 corresponding to the reference duty ratio D3. Similarly, as illustrated by a waveform (f) in FIG. 6, the control circuit 30 generates the gate signals QB and QC of the switching elements SW12 and SW13 by performing the PWM modulation with the cycle T3 and the reference pulse width T3×D3.

Returning to FIG. 3, when the adjustment of the frequency (S22) is completed, the control circuit 30 performs the PFM control with the frequency Fop as a reference frequency (S3).

As described above, in the charging system 1, at the time of activation, the control circuit 30 starts the operation of the switching elements SW11 to SW14 at the frequency F start higher than that the frequency at the time of the steady operation. The control circuit sets the reference duty ratio of the gate signal of the switching element to a predetermined duty ratio while maintaining the frequency Fstart. The control circuit 30 lowers the operation frequency of the switching element from the frequency Fstart to the frequency Fop for steady operation while maintaining the reference duty ratio of the gate signal of the switching element at the predetermined duty ratio. The control circuit 30 lowers, in a gradual manner or in a step-by-step manner, the operation frequencies of the switching elements SW11 to SW14 from Fstart to Fop while maintaining the reference duty ratio of the PWM control at D3. As a result, in the charging system 1, regardless of the load state of the battery, an inrush current can be suppressed at the time of activation, and the gate signals of the switching elements SW11 to SW14 can be appropriately adjusted.

Note that a voltage detection circuit that detects voltage of both terminals of the secondary winding L12 of the isolation transformer TR or voltage of one terminal thereof (for example, voltage of the node 20h or the output node 20d in FIG. 1) may be added such that the detected voltage is supplied to the control circuit 30. In this case, the control circuit 30 observes the voltage across the secondary winding L12 of the isolation transformer TR or the voltage at one terminal thereof at the time of activation and/or steady operation. The voltage across the secondary winding L12 is observed as a rectangular wave of positive and negative voltages, and the one terminal voltage is observed as a rectangular wave of a positive voltage. The control circuit 30 may determine the frequency Fstart at the time of activation such that the frequency Fstart becomes lower than the output voltage Vout on the basis of the observation results. As a result, the difference between the output voltage of the isolation transformer TR and the voltage of the battery BT can be reduced as much as possible, and the activation operation can be performed at a lower frequency. When the frequency during the steady operation is close to the activation frequency, the activation can be completed in a short time. In addition, the reference duty ratio of the PWM control is increased to approximately 0.5 (for example, in a range of 0.45 to 0.49) so as not to disturb the magnitude relationship of the voltage, the frequency is gradually changed to such an extent that the inrush current does not flow, and a desired power transmission operation is achieved, which is similar to the embodiment.

While certain embodiments have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

The charging system according to the present disclosure is capable of suppressing an inrush current.

What is claimed is:

1. A charging system comprising:
an alternating current/direct current (AC/DC) converter connected between: a first input node and a second input node, and a first intermediate node and a second intermediate node, the AC/DC converter being connected to an AC power supply via the first input node and the second input node;
a direct current/direct current (DC/DC) converter connected between: the first intermediate node and the second intermediate node, and a first output node and a second output node, the DC/DC converter being connectable to a battery via the first output node and the second output node, the DC/DC converter including an isolation transformer, a primary circuit, and a secondary circuit, the primary circuit being disposed on a primary side of the isolation transformer and including switching elements, the secondary circuit being disposed on a secondary side of the isolation transformer; and a control circuit that, in operation:

causes the switching elements to start operation at a first frequency when the AC/DC converter and the DC/DC converter are activated, causes the switching elements to operate at a second frequency when the AC/DC converter and the DC/DC converter are in steady operation, the first frequency being higher than the second frequency, when the AC/DC converter and the DC/DC converter are activated:

sets a reference duty ratio of a gate signal of each of the switching elements to a predetermined duty ratio while maintaining an operation frequency of each of the switching elements at the first frequency, and increases the reference duty ratio of the gate signal of each of the switching elements from zero to the predetermined duty ratio while maintaining an operation frequency of each of the switching elements at the first frequency.

2. The charging system according to claim 1, wherein the DC/DC converter is an inductor-inductor-capacitor (LLC) converter.

3. The charging system according to claim 1, wherein the first frequency is closer to a resonance frequency of the isolation transformer than the second frequency is.

4. The charging system according to claim 1, wherein the control circuit is further configured, when the AC/DC converter and the DC/DC converter are activated, to lower an operation frequency of each of the switching elements from the first frequency to the second frequency while maintaining a reference duty ratio of a gate signal of each of the switching elements at the predetermined duty ratio.

5. The charging system according to claim 4, wherein the control circuit lowers the operation frequency of each of the switching elements from the first frequency to the second frequency in a gradual manner or in a step-by-step manner.

* * * * *